G. F. DANIELSON.
TRUCK.
APPLICATION FILED MAR. 5, 1910.
1,023,997.
Patented Apr. 23, 1912.
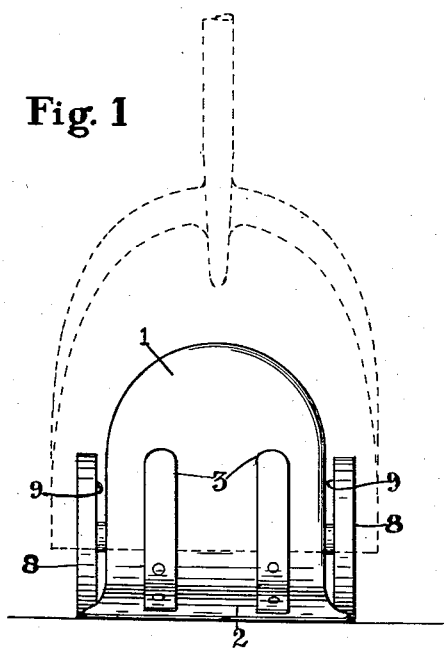
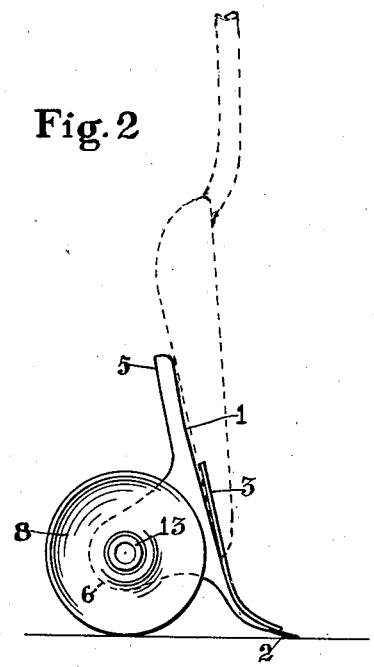
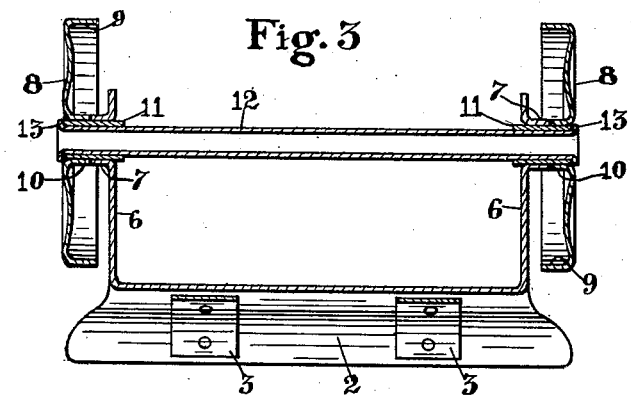
Witnesses
A. M. Shannon.
A. M. Dorr.
Inventor
GUSTAVE F. DANIELSON
By
Attorneys

UNITED STATES PATENT OFFICE.

GUSTAVE F. DANIELSON, OF YOUNGSTOWN, OHIO.

TRUCK.

1,023,997. Specification of Letters Patent. Patented Apr. 23, 1912.

Application filed March 5, 1910. Serial No. 547,571.

*To all whom it may concern:*

Be it known that I, GUSTAVE F. DANIELSON, a citizen of the United States of America, residing at Youngstown, in the county of Mahoning and State of Ohio, have invented certain new and useful Improvements in Trucks, of which the following is a specification, reference being had therein to the accompanying drawings.

This invention relates to trucks and more particularly to those known as "shovel trucks" and to features of construction thereof which insure the proper operation of the truck under heavy loads and reduce the cost of labor and material in the article itself.

The invention consists in the matters hereinafter set forth and more particularly pointed out in the appended claims.

Referring to the drawings, Figure 1 is a view in front elevation of a truck embodying features of the invention, Fig. 2 is a view in side elevation thereof with one wheel removed. Fig. 3 is a view in longitudinal section through the axle of a truck.

In the drawings a blade 1 of sheet metal is pressed or shaped up to conform to the back of a shovel or scoop and has an upturned foot 2 or shoe which is adapted to rest on the floor and be slipped under the edge or bottom of an article to be raised. Suitable clips 3 are riveted or otherwise secured to the face of the plate or blade to retain the scoop or shovel as indicated by the dotted lines in the drawings. The plate is stiffened by a marginal flange 5 which has a pair of depending alined ears 6. These are apertured, the struck out metal being pressed into ferrules 7 extending laterally from the ears.

Wheels for the truck are formed of disks 8 of sheet metal that are slightly dished for rigidity and have peripheral flanges 9 forming wheel treads. Wheel hubs are formed on the disks by perforating them and bending the struck-out metal into hub flanges 10 which are reinforced by ferrules 11 each pressed into a wheel and dimensioned to rotate smoothly in the ear bearings of the plate. An axle 12 that is preferably tubular is passed through the wheel ferrules and its ends are upset to form retaining beads 13 at the outer ends of the wheel ferrules. As the axle is free to rotate in the wheel ferrules and the wheel ferrules to turn in the hub bearings, of the plate, a very easy running truck is obtained which may be readily manufactured at a low cost and it is moved easily under great weights and stands rough usage to which it is put in warehouses.

Obviously, changes in the details of construction may be used without departing from the spirit of the invention, and I do not care to limit myself to any particular form or arrangement of parts.

What I claim as my invention is:—

1. A truck consisting of a body provided with a pair of ears to form bearings, wheels each formed of sheet-metal and having an integral central tubular hub, a ferrule tightly fitted into said hub and projecting beyond the same, said projections being journaled in said bearings, and an axle journaled in both of said ferrules and adapted to hold said ferrules within said bearings, and the wheel hub against the bearings.

2. A truck consisting of a sheet metal plate provided with a pair of ears integral therewith and having central out-turned annular flanges integral with the ears to form bearings, a pair of wheels each having a central hub flange adapted to abut the adjacent central ear-flange, a ferrule tight in each wheel-hub and journaled in the respective bearing and an axle extending through and journaled in the ferrules and having its ends expanded to form retaining beads for preventing outward movements of the ferrules.

In testimony whereof I affix my signature in presence of two witnesses.

GUSTAVE F. DANIELSON.

Witnesses:
OTTO F. BARTHEL,
ANNA M. DORR.

---

Copies of this patent may be obtained for five cents each, by addressing the "Commissioner of Patents, Washington, D. C."